United States Patent
Tung

(10) Patent No.: US 7,533,567 B2
(45) Date of Patent: May 19, 2009

(54) CAPACITANCE FUEL VOLUME MEASURING APPARATUS FOR FUEL CELL

(75) Inventor: Chun-Chin Tung, Chupei (TW)

(73) Assignees: Syspotek Corporation, Chupei (TW); Antig Technology Corporation, Grand Cayman (KY)

( * ) Notice: Subject to any disclaimer, the term of this patent is extended or adjusted under 35 U.S.C. 154(b) by 39 days.

(21) Appl. No.: 11/566,232

(22) Filed: Dec. 3, 2006

(65) Prior Publication Data

US 2007/0272008 A1    Nov. 29, 2007

(30) Foreign Application Priority Data

May 29, 2006   (TW) .............................. 95209249 U

(51) Int. Cl.
    *G01F 23/26*  (2006.01)
(52) U.S. Cl. ..................................... 73/304 C
(58) Field of Classification Search ................ 73/304 C
    See application file for complete search history.

(56) References Cited

U.S. PATENT DOCUMENTS

| | | | | |
|---|---|---|---|---|
| 3,862,571 A | * | 1/1975 | Vogel | 73/304 C |
| 6,293,145 B1 | * | 9/2001 | Wallrafen | 73/304 C |
| 2007/0252715 A1 | * | 11/2007 | Reddy et al. | 340/620 |

* cited by examiner

*Primary Examiner*—Hezron Williams
*Assistant Examiner*—Gunnar J Gissel

(57) ABSTRACT

A capacitance fuel volume measuring apparatus for a fuel cell is disclosed. The apparatus utilizes two electrode boards disposed in a fuel tank and an elastic element to perform calculation of the fuel volume in the fuel tank. The apparatus includes a structure disposed in the fuel tank and a control unit. The structure in the fuel tank includes two electrode boards and an elastic element, which maintains the liquid level of the fuel in a level and transmits essential data corresponding to the distance between the two electrode boards to the control unit for calculation such that the control unit may obtain the volume of the fuel in the fuel tank.

2 Claims, 3 Drawing Sheets

CAPACITANCE FUEL VOLUME MEASURING APPARATUS FOR FUEL CELL

FIELD OF THE INVENTION

The present invention relates to a capacitance fuel volume measuring apparatus for a fuel cell, characterizing at two electrode boards disposed in a fuel tank and an elastic element, wherein the two electrode boards and the substance between the two electrode boards form the capacitance apparatus, and the fuel volume in the fuel tank can be obtained by calculation of the accumulated electricity at the two electrode boards and the permittivity of the substance with a control unit.

BACKGROUND OF THE INVENTION

Conventionally, measurement of the fuel volume in a fuel tank of a fuel cell is estimated by a fuel surface height of the fuel, which can be obtained by the upper liquid level and the lower liquid level. However, the liquid level in the fuel tank is generally not in a simple equal level and may be variable with correspondence to the usage of the fuel. Thus, inaccuracy occurs in the measurement of the fuel volume, creating a negative effect for the performance of the fuel cell.

Accordingly, the invention utilizes the capacitance theory to maintain the fluid in the fuel tank in a stable form effectively for measurement of the fuel volume, thus enhancing the accuracy of the measurement while reducing the manufacturing cost.

SUMMARY OF THE INVENTION

The invention discloses a capacitance fuel volume measuring apparatus for a fuel cell. The theory of the invention is derived from a capacitor, which is formed by two parallel conductive electrode boards, with insulated substance (e.g. air) provided therebetween, and a direct current power supply is electrically connected to the electrode boards by a switch. The two electrode boards (hereafter electrode board A and electrode board B) maintain electronically neutral when the switch is off. When the switch is turned on to a conductive status, electrons of the electrode board A moves toward the anode such that the electrode board A contains positive electric charges; meanwhile the electrons at the cathode moves toward the electrode board B such that the electrode board B contains negative electric charges. Consequently, an electric field with a voltage difference V is formed between the electrode boards A and B. The electron movement continues in a way that electricity is proportional to the voltage of the power supply until the voltage difference V is equal to the voltage E of the power supply. In such process energy (i.e. the electron charges) is stored in the two electrode boards. Such a means formed by two parallel electrode boards with insulated substance therebetween for storing electron charges is referred to as a capacitor or a condenser. The electrode boards are referred to as the electrodes of the capacitor, and the insulated substance is referred to as the dielectric material or dielectrics. Capacitance of a capacitor refers to the amount (i.e. the capacity) of electron charges that the capacitor stores. The capacitance of the capacitor may be determined by the size, shape, volume and material of the electrode and the type of the dielectric material; however, the electron charge Q is proportional to the voltage V. That is:

$$C=Q/V \quad (1)$$

In the formula (1), the constant C is the capacitance of the capacitor. Practically, a capacitor is formed by two parallel metal boards with dielectric materials filled therebetween. The distance d between the two boards is a small distance in comparison to the area A of the boards, and the capacitance is proportional to the area A of the boards and the permittivity ∈ of the dielectric material and inversely proportional to the distance d between the boards. That is, $$C=(\in A)/d \quad (2)$$

wherein the permittivity of vacuum or air is ∈=8.84*10E-12 (F/m). In formula (2), the capacitance can he measured with a capacitance gauge, and the permittivity can be determined by the solution provided in the fuel tank. The area of the fuel tank is known. Thus, a control unit can be provided to calculate the parameters to obtain the liquid level height, and a corresponding concentration of the fuel can be obtained by experiments. Thus, the fuel volume can be accurately determined according to the liquid level height and the corresponding concentration of fuel.

DETAILED DESCRIPTION OF THE INVENTION

Figure 1:
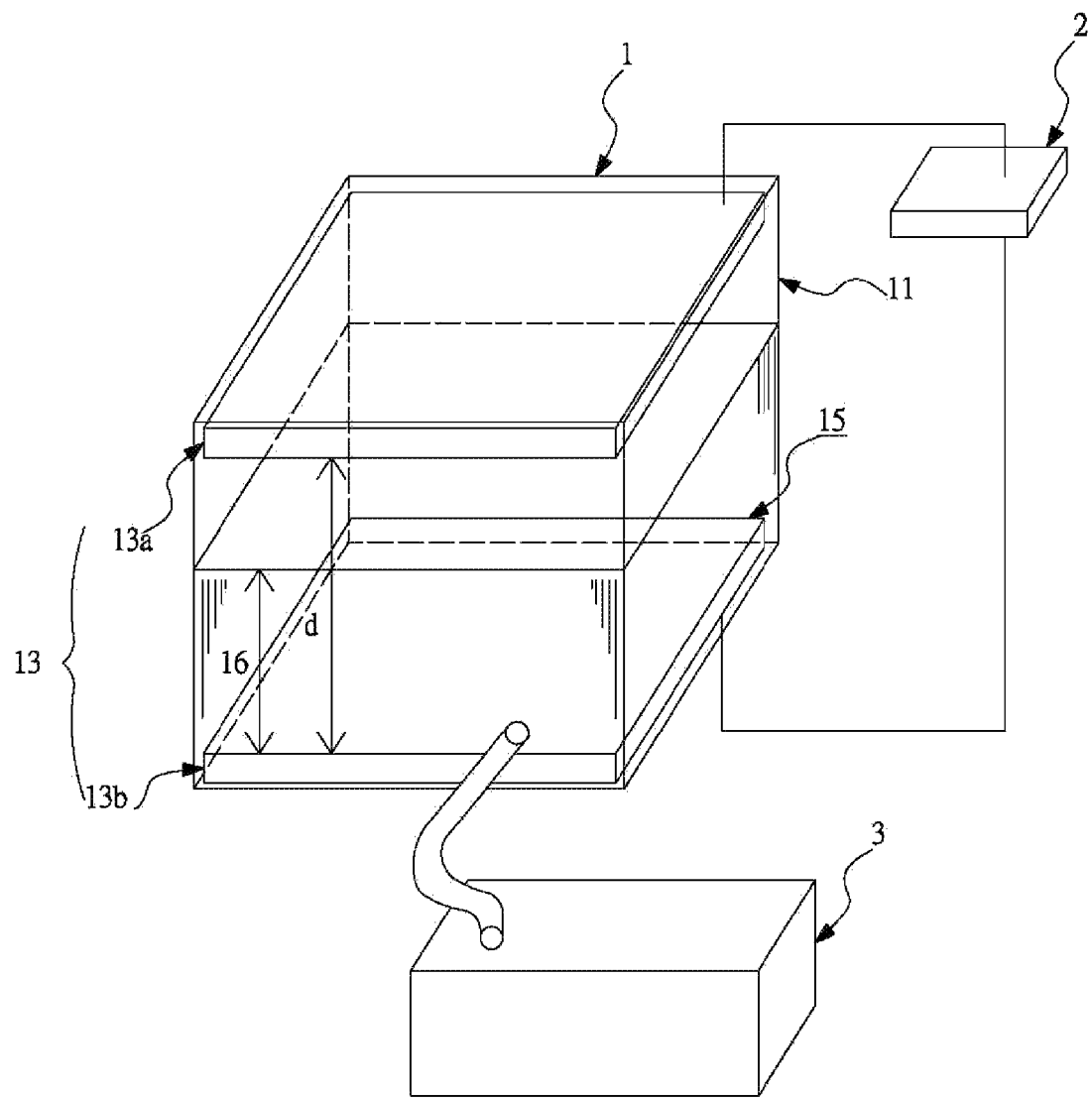
FIG. 1 is a perspective view of a first embodiment of a capacitance fuel volume measuring apparatus for a fuel cell of the invention.

FIG. 1 is a perspective view of a first embodiment of a capacitance fuel volume measuring apparatus for a fuel cell of the invention. The capacitance fuel volume measuring apparatus for a fuel cell comprises a fuel supply device 1 for supplying fuel to the fuel cell 3 and a control unit 2 comprising means for measuring the fuel volume.

The fuel supply device 1 comprises a fuel tank 11, which is a hollow structure forming a containing space for storing fuel 15 for the fuel cell 3. A first parallel metal board 13a and a second parallel metal board 13b are disposed in the containing space of the fuel tank 11. The first parallel metal board 13a and the second parallel metal board 13b are correspondingly disposed; in a preferred embodiment, the first parallel metal board 13a and the second parallel metal board 13b are disposed in parallel at the peripheral surface of the containing space to form a capacitor 13, and a substance disposed in the containing space of the fuel tank 11 serves as a dielectric material of the capacitor 13. Consequently, the capacitance of the capacitor 13 can be utilized to determine the volume of the fuel 15 in the fuel tank 11.

Furthermore, the control unit 2 is electronically connected to the capacitor 13, and comprises means for transforming capacitance to fuel volume. For a preferred embodiment, the control unit 2 can be implemented as a processor or a circuit, and the means for transforming capacitance to fuel volume of the control unit 2 has an algorithm for calculating the volume of the fuel 15 in the fuel tank 11 according to the capacitance of the capacitor 13. Corresponding information between the capacitance of the capacitor 13 and the volume of the fuel 15 in the fuel tank 11 can be obtained by experiments and stored in the means for transforming capacitance to fuel volume of the control unit 2.

Furthermore, the corresponding information between the capacitance of the capacitor 13 and the volume of the fuel 15 in the fuel tank 11 can be in a form of a function. Referring to FIG. 1, the functional relation is determined by the physical characteristics of the capacitor. In the first embodiment of the invention, the distance d between the first parallel metal board 13a and the second parallel metal board 13b and the effective area A of the first parallel metal board 13a and the second parallel metal board 13b are predetermined, and the capacitance C of the capacitor 13 can be obtained by the control unit 2. Thus, a corresponding effective permittivity $\in$ can be calculated by the formula $C=(\in A)/d$, and a volume of the fuel 15 or a liquid level height of the fuel 15 can be further calculated from the effective permittivity $\in$.

Figure 2:
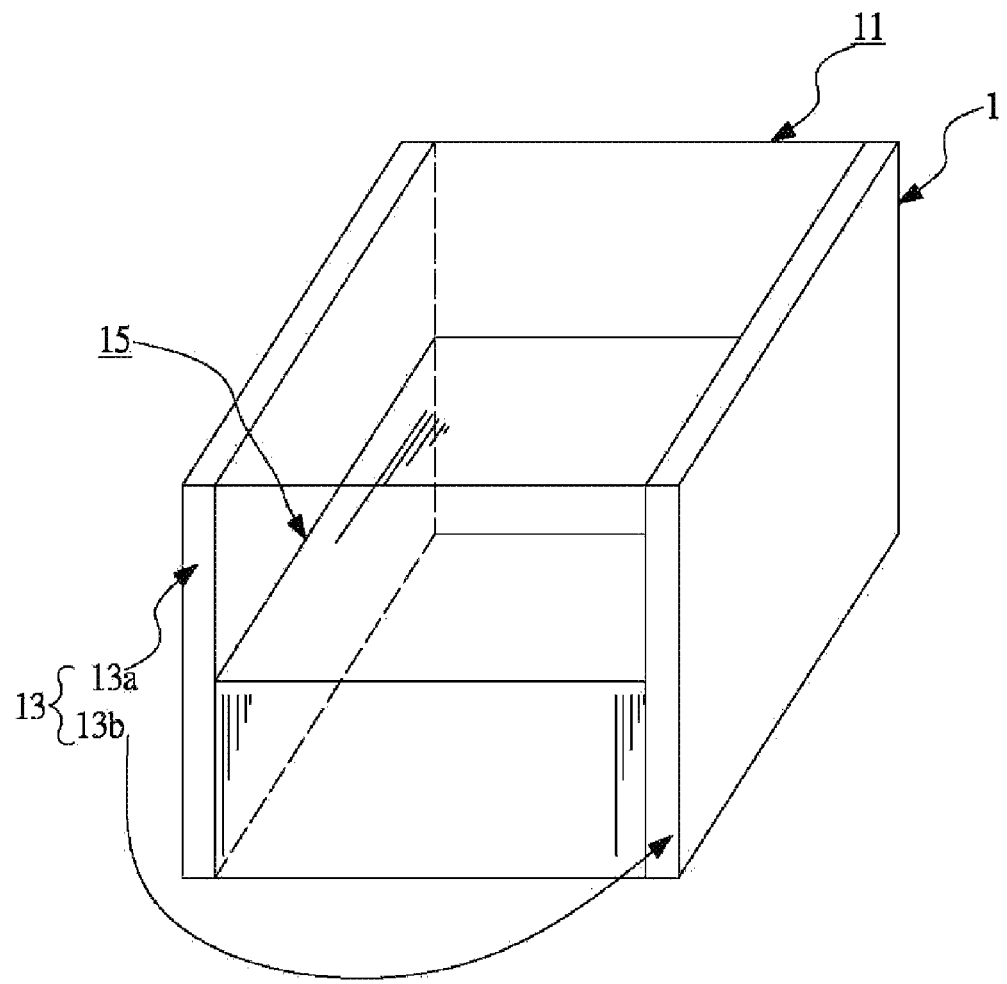
FIG. 2 is a perspective view of a second embodiment of a capacitance fuel volume measuring apparatus for a fuel cell of the invention.

FIG. 2 is a perspective view of a second embodiment of a capacitance fuel volume measuring apparatus for a fuel cell of the invention. As above-mentioned, 7 the capacitor 13 can be formed such that the containing space of the fuel tank 11 is formed between the first parallel metal board 13a and the second parallel metal board 13b. Accordingly, the first parallel metal board 13a and the second parallel metal board 13b of the capacitor 13 can be disposed parallel to the liquid level of the fuel 15, as shown in FIG. 1, or can be disposed perpendicular to the liquid level of the fuel 15, as shown in FIG. 2.

Figure 3:
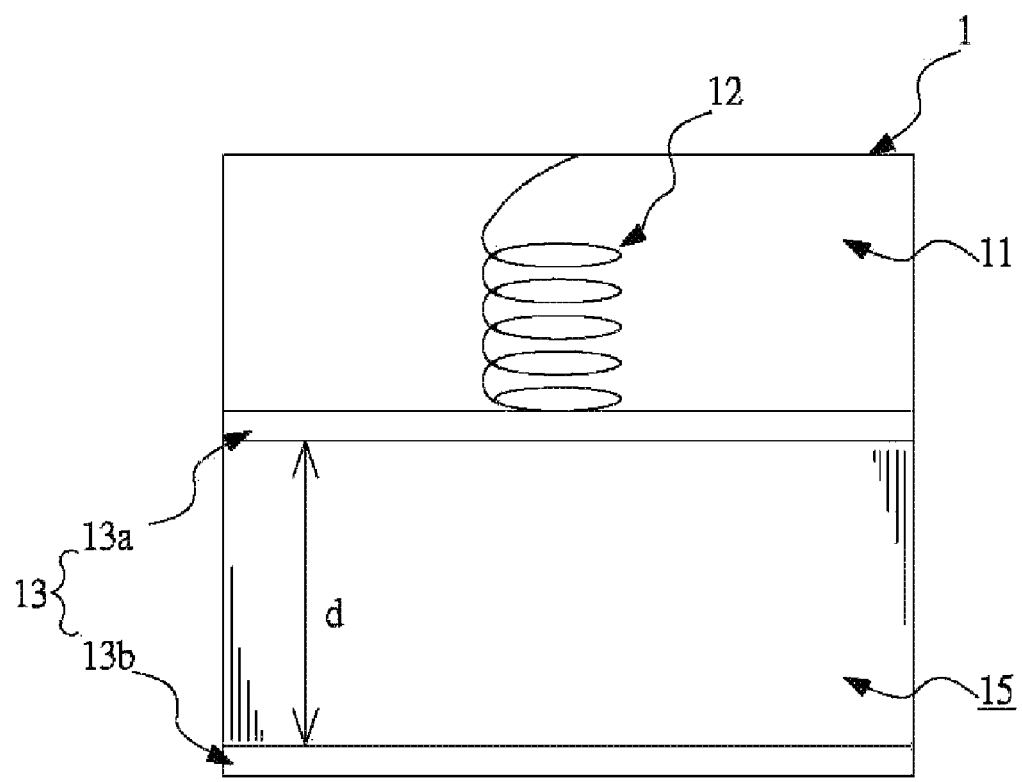
FIG. 3 is a front view of a third embodiment of a capacitance fuel volume measuring apparatus for a fuel cell of the invention.

FIG. 3 is a front view of a third embodiment of a capacitance fuel volume measuring apparatus for a fuel cell of the invention. In this embodiment, the first parallel metal board 13a of the capacitor 13 is slidably disposed in the containing space of the fuel tank 11, and an elastic element 12 is disposed between the first parallel metal board 13a and a peripheral surface of the containing space of the fuel tank 11. Another surface of the first parallel metal board 13a is configured to contact the liquid level of the fuel 15. Thus, the elastic element 12 is configured to provide an elastic force along a direction to urge the first parallel metal board 13a against the liquid level of the fuel 15 such that the first parallel metal board 13a maintains contacting the liquid level of the fuel 15. In this way, the effective permittivity $\in$ directly corresponds to the permittivity of the fuel and the liquid level height of the fuel, and the liquid level height of the fuel effectively corresponds to the distance d between the first parallel metal board 13a and the second parallel metal board 13b (since the difference between the liquid level height and the distance d is constant). As a result, the distance d or the volume of the fuel 15 can be obtained by calculation according to the corresponding information or the functional relation stored in the means for transforming capacitance to fuel volume of the control unit 2.

Furthermore, the elastic force provided by the elastic element 12 is along the direction to urge the first parallel metal board 13a against the liquid level of the fuel 15. Since the elastic force is configured to act urge the first parallel metal board 13a, the elastic element 12 can be disposed in, but not limited to, a position between the first parallel metal board 13a and the peripheral surface of the containing space of the fuel tank 11.

In the capacitance fuel volume measuring apparatus of the invention, the control unit 2 can be disposed in the fuel supply device 1 or in the fuel cell 3.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A capacitance fuel volume measuring apparatus for a fuel cell comprising:
   a fuel supply means having a fuel tank with a containing space for receiving a fuel and a capacitor, wherein the capacitor further comprises a first parallel metal board slidably positioned at a side of said fuel tank with a surface of the first parallel metal board being configured to contact a liquid level of the fuel and a second parallel metal board positioned at another side opposite to said first parallel metal board and; and
   a control unit being electrically connected to said capacitor;
   characterized in that the fuel tank further comprises an elastic element, which is disposed in the containing space and configured to provide an elastic force along a direction to urge the first parallel metal board against the liquid level of the fuel.

2. The capacitance fuel volume measuring apparatus as claimed in claim 1, wherein the elastic element is disposed between the first parallel metal board and a peripheral surface of the containing space of the fuel tank.

\* \* \* \* \*